US010120338B2

(12) United States Patent
Ogasawara et al.

(10) Patent No.: US 10,120,338 B2
(45) Date of Patent: Nov. 6, 2018

(54) HOLOGRAPHIC-STEREOGRAM-FORMING APPARATUS, DIFFUSING MEMBER, AND HOLOGRAPHIC-STEREOGRAM-FORMING METHOD

(71) Applicant: FUJI XEROX CO., LTD., Tokyo (JP)

(72) Inventors: Yasuhiro Ogasawara, Kanagawa (JP); Jiro Minabe, Kanagawa (JP); Shigetoshi Nakamura, Kanagawa (JP); Takashi Kikuchi, Kanagawa (JP); Masahiro Igusa, Kanagawa (JP); Motohiko Sakamaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 117 days.

(21) Appl. No.: 15/007,799

(22) Filed: Jan. 27, 2016

(65) Prior Publication Data
US 2017/0038729 A1 Feb. 9, 2017

(30) Foreign Application Priority Data

Aug. 6, 2015 (JP) .................................. 2015-155949

(51) Int. Cl.
G02B 5/02 (2006.01)
G03H 1/04 (2006.01)
G03H 1/26 (2006.01)

(52) U.S. Cl.
CPC ........... *G03H 1/268* (2013.01); *G02B 5/0263* (2013.01); *G03H 1/041* (2013.01); *G02B 5/0257* (2013.01);
(Continued)

(58) Field of Classification Search
CPC .................. G03H 1/268; G03H 2001/2685
See application file for complete search history.

(56) References Cited

U.S. PATENT DOCUMENTS 3,754,814 A * 8/1973 Leith ........................ G03H 1/32
359/559
5,225,920 A * 7/1993 Kasazumi ......... G02F 1/133528
349/1
(Continued)

FOREIGN PATENT DOCUMENTS

| CN | 1352761 A | 6/2002 |
|---|---|---|
| CN | 101430538 A | 5/2009 |
| JP | 10-20747 A | 1/1998 |

OTHER PUBLICATIONS

Communication dated Jul. 4, 2018 issued by the State Intellectual Property Office of People's Republic of China in counterpart application No. 201610130385.2.

*Primary Examiner* — Kimberly N. Kakalec
(74) *Attorney, Agent, or Firm* — Sughrue Mion, PLLC

(57) ABSTRACT

A holographic-stereogram-forming apparatus includes a laser beam source that generates a laser beam to be split into an object beam and a reference beam; a display that displays an original image corresponding to a substantially strip-shaped holographic element constituting a holographic stereogram containing parallax information in a horizontal direction; a diffusing unit provided on a light-emission side of the display and including optical elements having different thicknesses in a direction of light transmission, the optical elements being arranged in a matrix and each having a substantially rectangular shape with a vertical length being shorter than a horizontal length, the diffusing unit diffusing object beam more widely in the vertical direction than in the horizontal direction, the object beam to be diffused by the diffusing unit being generated by the display; and a condensing unit that condenses the object beam diffused by the diffusing unit on a hologram recording medium.

9 Claims, 7 Drawing Sheets

(52) U.S. Cl.
CPC ............... *G03H 2001/0426* (2013.01); *G03H 2001/2695* (2013.01); *G03H 2210/22* (2013.01); *G03H 2223/13* (2013.01); *G03H 2223/14* (2013.01); *G03H 2223/21* (2013.01)

(56) References Cited

U.S. PATENT DOCUMENTS

| | | | |
|---|---|---|---|
| 5,949,559 | A | 9/1999 | Kihara et al. |
| 6,317,263 | B1 | 11/2001 | Moshrefzadeh et al. |
| 2009/0116087 | A1 | 5/2009 | Shirakura et al. |

* cited by examiner

DIFFRACTION ANGLE: $\theta_N = \sin^{-1}(N\lambda/D)$

BROADENING OF DIFFRACTED LIGHT: $z = f \times \tan\theta_N$

FIG. 6

| | | |
|---|---|---|
| VERTICAL FIELD OF VIEW | ±20° | CALCULATION FORMULA |
| VERTICAL PITCH OF DIFFRACTION GRATING (D) | 1.5 μm | |
| DIFFRACTION ANGLE (EMERGENCE ANGLE) $\theta_N$ | 20.77 (N=1) | $\sin^{-1}(N\lambda/D)$ |
| FOCAL LENGTH f OF RELAY LENS [mm] | 60 | |
| BROADENING z OF DIFFRACTED LIGHT [mm] | 22.8 | $f \times \tan\theta_N$ |
| VERTICAL SIZE OF IMAGE [mm] | 4.047 | 19 μm×213 PIXELS |
| NUMBER OF PIXELS IN VERTICAL DIRECTION [PIXELS] | 213 | |
| TOTAL SIZE OF IMAGE AND DIFFRACTED LIGHT [mm] | 49.57 | 4.047+2×22.8 |
| DIAMETER OF RELAY LENS [mm] | 75 | |
| HORIZONTAL SIZE OF IMAGE [mm] | 19.456 | 19 μm×1024 PIXELS |
| NUMBER OF PIXELS IN HORIZONTAL DIRECTION [PIXELS] | 1024 | |
| HORIZONTAL FIELD OF VIEW | ±20.5 | $\tan^{-1}((19.456/2)/26)$ |

HOLOGRAPHIC-STEREOGRAM-FORMING APPARATUS, DIFFUSING MEMBER, AND HOLOGRAPHIC-STEREOGRAM-FORMING METHOD

CROSS-REFERENCE TO RELATED APPLICATIONS

This application is based on and claims priority under 35 USC 119 from Japanese Patent Application No. 2015-155949 filed Aug. 6, 2015.

BACKGROUND

Technical Field

The present invention relates to a holographic-stereogram-forming apparatus, to a diffusing member, and to a holographic-stereogram-forming method.

SUMMARY

According to an aspect of the invention, there is provided a holographic-stereogram-forming apparatus including a laser beam source that generates a laser beam to be split into an object beam and a reference beam, the object beam being applied to a hologram recording medium; a display that displays an original image corresponding to a substantially strip-shaped holographic element constituting a holographic stereogram containing parallax information in a horizontal direction; a diffusing unit provided on a light-emission side of the display and including a plurality of optical elements having different thicknesses in a direction of light transmission, the optical elements being arranged side by side in the horizontal direction and in a vertical direction in a matrix, the optical elements each having a substantially rectangular shape with a vertical length being shorter than a horizontal length, the diffusing unit diffusing the object beam more widely in the vertical direction than in the horizontal direction, the object beam to be diffused by the diffusing unit being generated by the display; and a condensing unit that condenses the object beam diffused by the diffusing unit on the hologram recording medium.

BRIEF DESCRIPTION OF THE DRAWINGS

An exemplary embodiment of the present invention will be described in detail based on the following figures, wherein:

FIG. 6 is a table summarizing exemplary parameters that widens the field of view in the vertical direction.

DETAILED DESCRIPTION

Principle of Holographic Stereography

First, the principle of holographic stereography will be described.

Figure 1A:
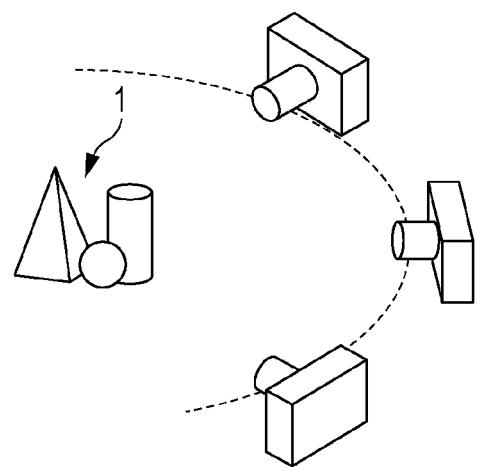
FIGS. 1A and 1B are schematic diagrams illustrating the principle of holographic stereography.
Figure 1B:
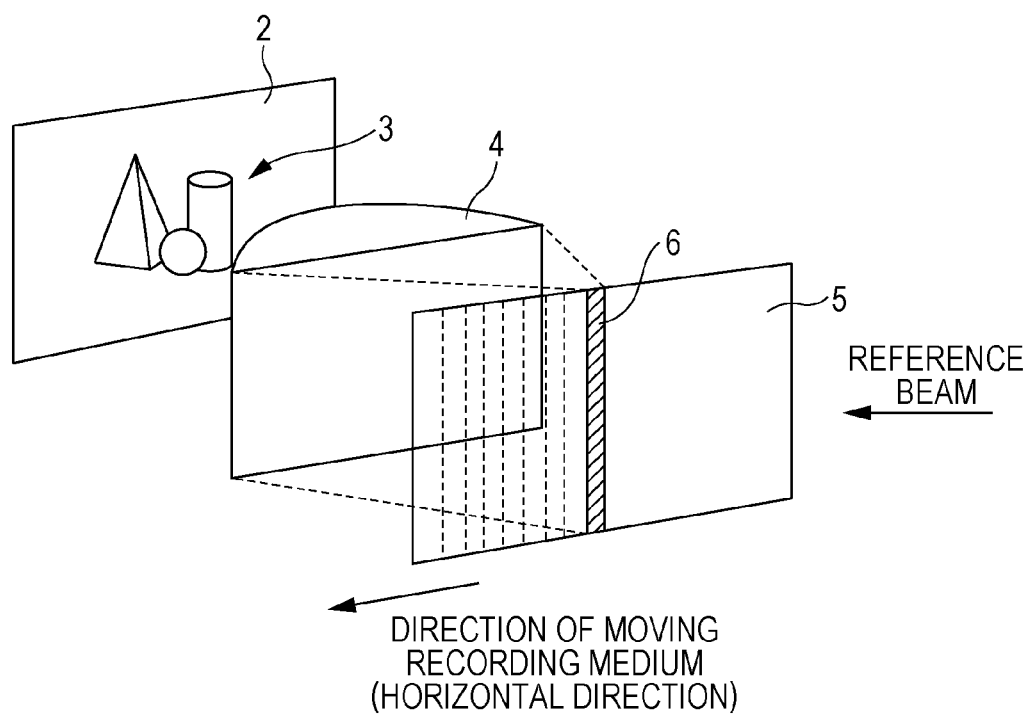

FIGS. 1A and 1B are schematic diagrams illustrating the principle of holographic stereography. Holographic stereography is one of methods of displaying three-dimensional images. A holographic stereogram is formed by sequentially recording plural original images 3 as holographic elements upon one hologram recording medium 5. The plural original images 3 are two-dimensional images of an object 1 that are taken while the observation point is changed gradually.

For example, in a holographic stereogram containing parallax information only in the horizontal direction, original images 3 of the object 1 are taken sequentially while the observation point is changed gradually in the horizontal direction as illustrated in FIG. 1A. Subsequently, as illustrated in FIG. 1B, one of the original images 3 is displayed on a display device 2, and an object beam transmitted through the display device 2 is condensed on the hologram recording medium 5 by a condensing lens 4. The object beam is made to interfere with a reference beam, whereby a strip-shaped or substantially strip-shaped holographic element 6 is recorded on the hologram recording medium 5. In this manner, the plural original images 3 are sequentially displayed on the display device 2 while the hologram recording medium 5 is moved, and holographic elements 6 corresponding to the respective original images 3 each displayed on the display device 2 are sequentially recorded on the hologram recording medium 5.

When white light is applied over the entirety of the hologram recording medium 5 having a holographic stereogram containing parallax information only in the horizontal direction, all of the holographic elements 6 based on different observation points are reproduced. Hence, when an observer sees the holographic stereogram with his/her both eyes, the observer sees two original images 3 that correspond to the left and right eye points, respectively. Since the original images 3 that correspond to the left and right eye points are different, the observer recognizes the parallax. Accordingly, the holographic stereogram is recognized as a three-dimensional image.

The holographic stereogram containing parallax information only in the horizontal direction is effective for a movement of the observation point in the horizontal direction but is not effective for a movement of the observation point in the vertical direction. That is, the field of view in the vertical direction is narrow. In the related-art, to provide a satisfactory field of view in the vertical direction, a one-dimensional diffusing plate that diffuses light in the vertical direction is provided in front of the hologram recording medium. In such a configuration, however, it is difficult to suppress noise generation.

In a holographic-stereogram-forming apparatus according to the present exemplary embodiment, no diffusing plate is provided in front of the hologram recording medium, but a diffusing member that diffuses light on the basis of the principle of optical diffraction more widely in the vertical direction than in the horizontal direction is provided in front of the condensing lens. Thus, while noise generation is suppressed, the field of view in the vertical direction is widened. Details of the apparatus and the diffusing member according to the exemplary embodiment will now be described.

Holographic-Stereogram-Forming Apparatus

Figure 2:
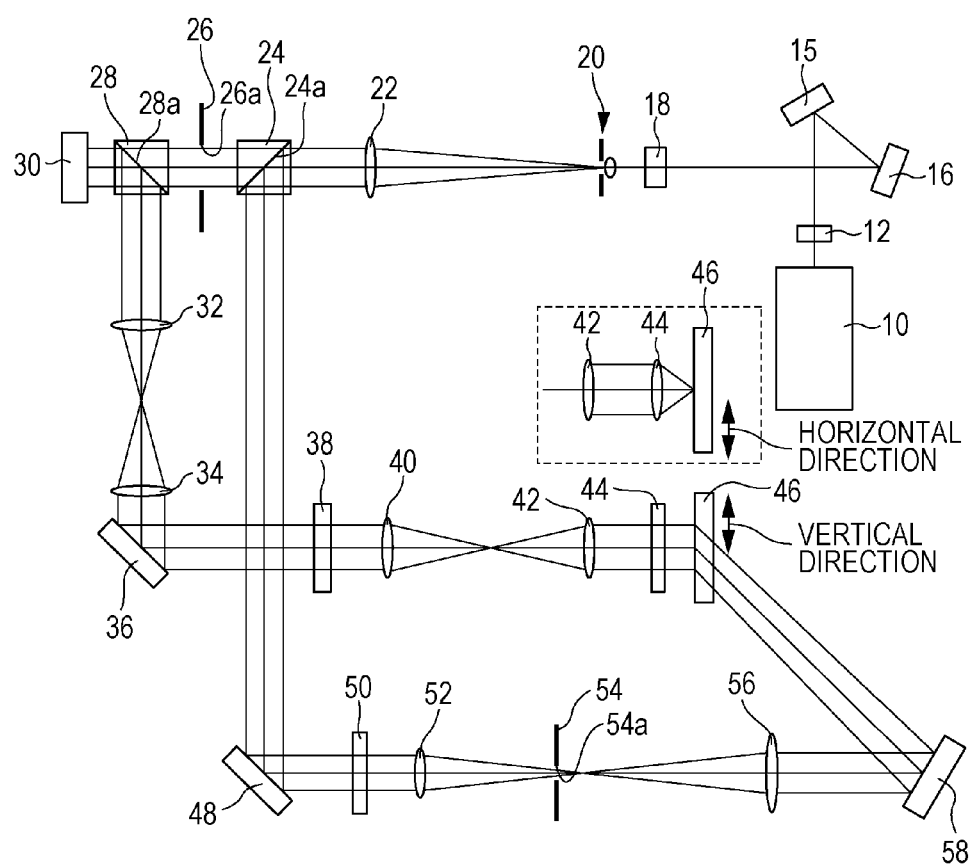
FIG. 2 illustrates an exemplary configuration of a holographic-stereogram-forming apparatus.

FIG. 2 illustrates an exemplary configuration of the holographic-stereogram-forming apparatus (hereinafter referred to as "forming apparatus"). The forming apparatus according to the present exemplary embodiment forms a holographic stereogram containing parallax information only in the horizontal direction. FIG. 2 is a top view of the forming apparatus.

As illustrated in FIG. 2, the forming apparatus includes a laser beam source 10. The laser beam source 10 emits a coherent laser beam generated by laser oscillation. The laser beam source 10 according to the present exemplary embodiment is a green solid-state laser that emits a laser beam having a wavelength of 532 nm and has an optical output of 1 W.

A shutter 12 that blocks the laser beam is provided on a beam-emission side of the laser beam source 10. The shutter 12 is retractable from the optical path. A mirror 15 and a mirror 16 are provided on a beam-traveling side of the shutter 12. The mirror 15 and the mirror 16 each reflect incoming light and thus redirect the optical path toward a polarization beam splitter 24.

A half-wave plate 18, a spatial filter 20, a lens 22, and the polarization beam splitter 24 are provided in that order on a reflected-beam side of the mirror 16 along the optical path after the mirror 16. The half-wave plate 18 adjusts the intensity ratio of an object beam to a reference beam by rotating the plane of polarization of incoming light. The spatial filter 20 and the lens 22 collimate the beam transmitted through the half-wave plate 18 and allow the collimated beam to enter the polarization beam splitter 24.

The polarization beam splitter 24 includes a reflecting surface 24a that transmits p-polarized light but reflects s-polarized light. The polarization beam splitter 24 splits the laser beam into an object-beam portion and a reference-beam portion. A portion of the beam that is transmitted through the polarization beam splitter 24 serves as the object-beam portion (p-polarized light). A portion of the beam that is reflected by the polarization beam splitter 24 serves as the reference-beam portion (s-polarized light).

An optical system that generates the object beam will be now described. A slit 26 and a polarization beam splitter 28 are provided in that order on a transmitted-beam side of the polarization beam splitter 24 along the optical path after the polarization beam splitter 24. The slit 26 shapes the object-beam portion (p-polarized light) into a rectangular beam and allows the rectangular beam to enter the polarization beam splitter 28. The polarization beam splitter 28 includes a reflecting surface 28a that transmits p-polarized light but reflects s-polarized light.

A reflective display device 30 is provided on a transmitted-beam side of the polarization beam splitter 28. The display device 30 includes plural pixels and displays an image based on image information by modulating at least one of the amplitude, the phase, and the direction of polarization of incoming light for each of the pixels. The display device 30 may be, for example, a spatial light modulator. In the present exemplary embodiment, a reflective liquid crystal on silicon (LCOS) is employed as the display device 30, and an image is displayed on a display area of the LCOS.

The object-beam portion is modulated and reflected by the display device 30, whereby an object beam to be used for recording a hologram is generated. More specifically, when the object-beam portion in the form of the p-polarized light is reflected by the display device 30, the object-beam portion is converted into s-polarized light. Then, the s-polarized light serving as the object beam enters the polarization beam splitter 28 again and is reflected by the reflecting surface 28a of the polarization beam splitter 28.

A lens 32, a lens 34, and a mirror 36 are provided in that order on a reflected-beam side of the polarization beam splitter 28 along the optical path after the polarization beam splitter 28. The object beam reflected by the polarization beam splitter 28 is relayed by the lens 32 and the lens 34 and is applied to the mirror 36. The mirror 36 redirects the optical path of the object beam toward a hologram recording medium 46.

A diffusing member 38, a lens 40, a lens 42, and a condensing lens 44 are provided in that order along the optical path between the mirror 36 and the hologram recording medium 46. The condensing lens 44 is a cylindrical lens or the like that condenses incoming light only in a one-dimensional direction (the horizontal direction).

In FIG. 2, the direction orthogonal to the plane of the page corresponds to the horizontal direction, and the direction parallel to the plane of the page corresponds to the vertical direction. Each strip-shaped or substantially strip-shaped holographic element is recorded such that the long-side direction thereof corresponds to the vertical direction and the short-side direction thereof corresponds to the horizontal direction. The hologram recording medium 46 is held by a holding member (not illustrated) and is moved in the horizontal direction by a moving device (not illustrated) after every recording of a holographic element.

The diffusing member 38 diffuses the object beam, which is transmitted therethrough, on the basis of the principle of optical diffraction more widely in the vertical direction than in the horizontal direction. The object beam transmitted through the diffusing member 38 is relayed by the lens 40 and the lens 42, is condensed only in the horizontal direction by the condensing lens 44, and is applied to the hologram recording medium 46. The way the object beam is condensed only in the horizontal direction is illustrated as a side view enclosed by the broken line in FIG. 2.

Now, an optical system that generates the reference beam will be described. A mirror 48, a slit 50, a lens 52, a douser 54 having an aperture 54a, a lens 56, and a mirror 58 are provided in that order on a reflected-beam side of the polarization beam splitter 24 along the optical path after the polarization beam splitter 24. The mirror 48 redirects the optical path of the reference beam toward the mirror 58.

The slit 50 shapes the reference beam into a rectangular beam and allows the rectangular beam to enter the lens 52. The reference beam having entered the lens 52 is relayed and broadened by the lens 52 and the lens 56, respectively, while passing through the aperture 54a before being applied to the mirror 58. The aperture 54a is provided at the focal position between the lens 52 and the lens 56.

The mirror 58 reflects the reference beam transmitted through the lens 56 and redirects the optical path of the reference beam toward the hologram recording medium 46. In the present exemplary embodiment, the reference beam is applied to the hologram recording medium 46 from a side different from the side of application of the object beam to the hologram recording medium 46. The reference beam is applied to the hologram recording medium 46 such that the optical axis thereof intersects the optical axis of the object beam in the hologram recording medium 46.

The above optical systems are only exemplary, and some of the lenses, mirrors, and other elements may be omitted, or other elements may be added thereto, according to design need.

Figure 3:
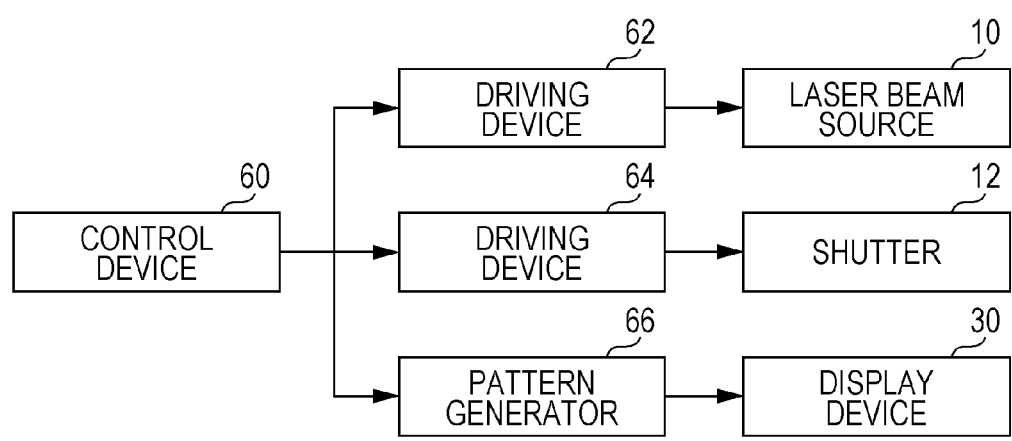
FIG. 3 is a block diagram illustrating an exemplary electrical configuration of the holographic-stereogram-forming apparatus.

Now, an electrical configuration of the forming apparatus will be described. FIG. 3 is a block diagram illustrating an exemplary electrical configuration of the holographic-stereogram-forming apparatus. The forming apparatus includes a control device 60 that controls the entirety of the forming apparatus. The control device 60 is a computer and includes a central processing unit (CPU), a read-only memory (ROM) that stores associated programs, a random access memory (RAM) that is used as a work area during the execution of any of the programs, a nonvolatile memory that stores pieces of associated information, and so forth.

The laser beam source 10 is connected to the control device 60 via a driving device 62. The driving device 62 turns on the laser beam source 10 in accordance with an instruction from the control device 60. The shutter 12 is connected to the control device 60 via a driving device 64. The driving device 64 opens or closes the shutter 12 in accordance with an instruction from the control device 60. The display device 30 is connected to the control device 60 via a pattern generator 66. The pattern generator 66 generates a pattern in accordance with image information supplied thereto from the control device 60. Each of the plural pixels of the display device 30 modulates incoming light in accordance with the pattern. Thus, an image corresponding to the image information is displayed. The half-wave plate 18 and other movable devices (not illustrated) are also driven by respective driving devices (not illustrated) in accordance with instructions from the control device 60.

Now, a process of recording a hologram will be described. The driving device 62 turns on the laser beam source 10. The driving device 64 retracts the shutter 12 from the optical path, thereby allowing the laser beam to travel on. While the laser beam source 10 emits the laser beam, the control device 60 supplies image information to the pattern generator 66, whereby an image is displayed on the display device 30 at a predetermined timing. Thus, a process of recording a hologram upon the hologram recording medium 46 is performed.

More specifically, the laser beam emitted from the laser beam source 10 is reflected by the mirror 15 and by the mirror 16 and enters the half-wave plate 18, where the plane of polarization of the laser beam is rotated. The laser beam is then collimated by the spatial filter 20 and the lens 22 and enters the polarization beam splitter 24, where the laser beam is split into an object-beam portion (p-polarized light) and a reference-beam portion (s-polarized light).

The p-polarized light obtained as the object-beam portion transmitted through the polarization beam splitter 24 is shaped into a rectangular beam by the slit 26 and is modulated by the display device 30 into an object beam in accordance with the image information. When the object-beam portion in the form of the p-polarized light is reflected by the display device 30, the object-beam portion is converted into s-polarized light. Then, the s-polarized light now serving as the object beam enters the polarization beam splitter 28 again and is reflected by the reflecting surface 28a.

The object beam reflected by the polarization beam splitter 28 is relayed by the lens 32 and the lens 34 and is reflected by the mirror 36 toward the hologram recording medium 46. The object beam thus reflected is diffused by the diffusing member 38 more widely in the vertical direction than in the horizontal direction, is relayed by the lens 40 and the lens 42, is condensed only in the horizontal direction by the condensing lens 44, and is applied to the hologram recording medium 46. The diffusing member 38 provided in front of the lens 40 diffuses incoming light on the basis of the principle of optical diffraction more widely in the vertical direction than in the horizontal direction, thereby widening the field of view in the vertical direction while suppressing the noise generated on a resulting hologram. If a relay lens is added to the optical system, the diffusing member 38 may be provided at another position between the display device 30 and the condensing lens 44.

Meanwhile, the s-polarized light (reference beam) obtained as the light reflected by the polarization beam splitter 24 is reflected by the mirror 48 and is shaped into a rectangular beam by the slit 50. The reference beam thus shaped is relayed and broadened by the lens 52 and the lens 56, respectively, while passing through the aperture 54a. The reference beam transmitted through the lens 56 is reflected by the mirror 58 and is applied to the hologram recording medium 46 from the side different from the side of application of the object beam to the hologram recording medium 46.

The object beam and the reference beam corresponding to one original image are simultaneously applied to the hologram recording medium 46 and interfere with each other, whereby a holographic element is recorded on the hologram recording medium 46. In the present exemplary embodiment, the reference beam is applied to the hologram recording medium 46 from the side different from the side of application of the object beam to the hologram recording medium 46. Thus, a reflective hologram is recorded at a high density in the thickness direction. While the hologram recording medium 46 is moved in the horizontal direction, strip-shaped or substantially strip-shaped holographic elements that correspond to plural original images are sequentially recorded on the hologram recording medium 46 in such a manner as to be arranged side by side in the horizontal direction.

One-Dimensional Diffusion Based on Diffraction Principle

Figure 4:
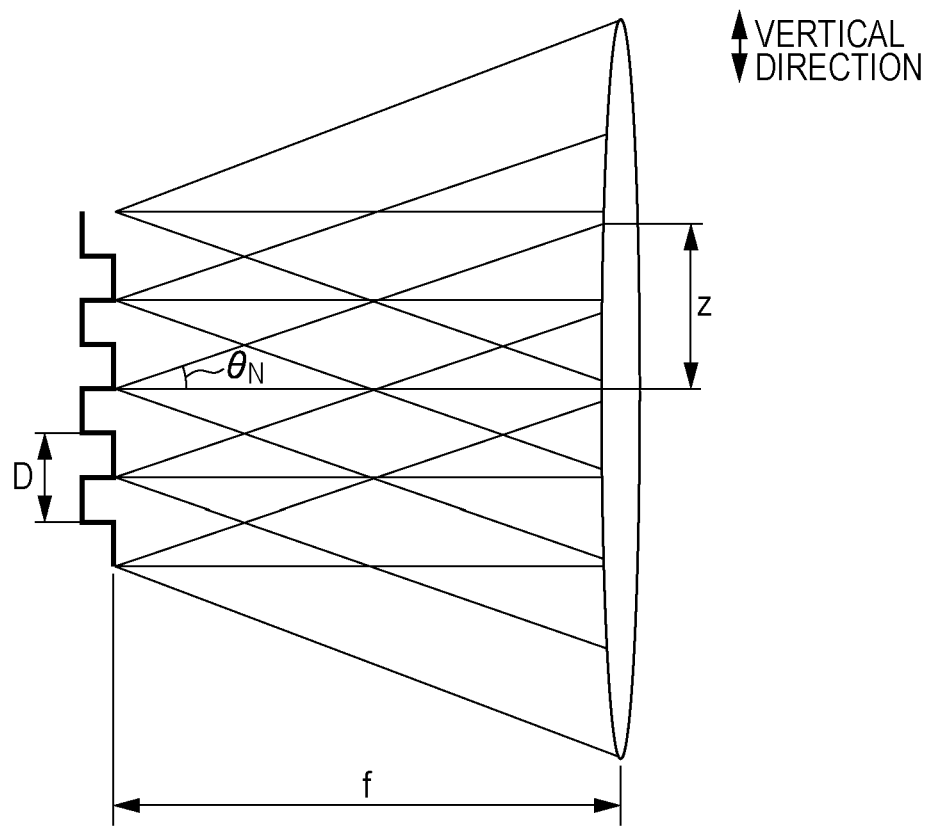
FIG. 4 is a schematic diagram illustrating how light is diffused by a diffusing member on the basis of the principle of optical diffraction.

Now, a principle of diffusing light more widely in the vertical direction than in the horizontal direction will be described. FIG. 4 is a schematic diagram illustrating how light is diffused by a diffraction grating, i.e., the diffusing member 38, on the basis of the principle of optical diffraction. Here, the grating pitch of the diffusing member 38 is denoted by D, the diffraction angle is denoted by $\theta_N$, the broadening of diffracted light is denoted by z, and the focal length of the lens adjacent to the diffusing member 38 is denoted by f. The grating pitch D in the vertical direction corresponds to the total length of two optical elements. Under such conditions, the diffraction angle $\theta_N$ and the broadening z of diffracted light are expressed as follows:

$$\text{diffraction angle } \theta_N = \sin^{-1}(N\lambda/D) \quad (1)$$

$$\text{broadening } z \text{ of diffracted light} = f \times \tan \theta_N \quad (2)$$

where N denotes the order of diffraction, and $\lambda$ denotes the wavelength.

Figure 5A:
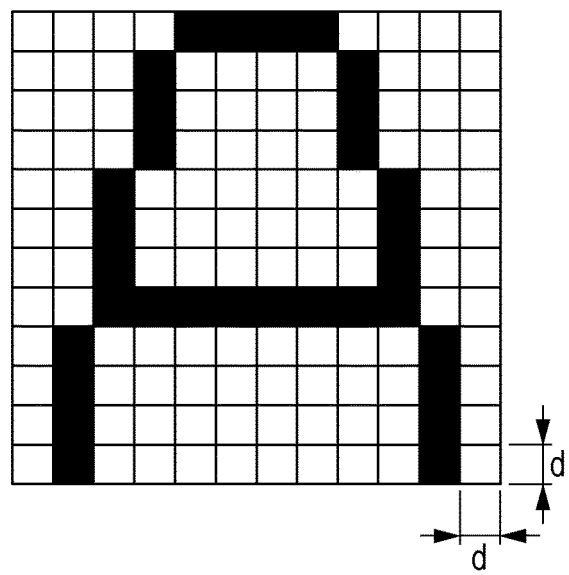
FIG. 5A is a schematic diagram illustrating an exemplary configuration of a display device.
Figure 5B:
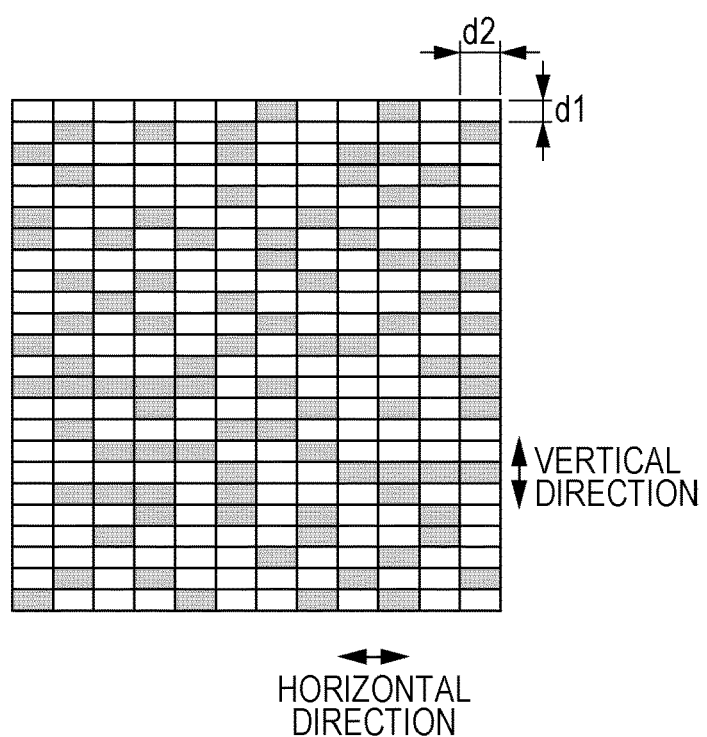
FIG. 5B is a schematic diagram illustrating an exemplary configuration of the diffusing member.

Now, the diffusing member 38 will be described. FIG. 5A is a schematic diagram illustrating an exemplary configuration of the display device 30. FIG. 5B is a schematic diagram illustrating an exemplary configuration of the diffusing member 38. As illustrated in FIG. 5B, the diffusing member 38 includes plural optical elements each having a vertical length d1 and a horizontal length d2 (>d1). The plural optical elements are arranged side by side in the vertical direction and in the horizontal direction in a matrix. According to Expression (1) given above, the diffraction angle $\theta_N$ is inversely proportional to the grating pitch D. Therefore, to make the diffraction angle in the vertical direction larger than the diffraction angle in the horizontal direction, a relationship of d2>d1 is to be established.

The plural optical elements arranged in a matrix each have a rectangular or substantially rectangular plan-view shape whose long-side direction corresponds to the horizontal direction. The vertical length d1 of each optical element is shorter than the horizontal length d2 of the optical element.

The plural optical elements have different thicknesses in the direction of light transmission. The difference in the thickness is represented as the difference in the gray level in FIG. 5B. The optical elements having different thicknesses shift the phase of the light in different ways while the light is transmitted therethrough. As the difference in the phase shifts become more random, low-frequency components of the object beam are more widely diffused. Consequently, resulting holographic elements are recorded efficiently.

For example, the diffusing member 38 illustrated in FIG. 5B may be fabricated by randomly etching the surface of a transparent substrate made of quartz glass or the like such that optical elements of different thicknesses are formed, as in the case of fabricating a random-phase mask. The term "transparent" used herein refers to being capable of transmitting light having a wavelength that is used in the recording of a hologram. Note that all of the optical elements do not necessarily need to have respectively different thicknesses. For example, letting the wavelength be $\lambda$ and the refractive index of the transparent substrate be n and supposing that the depth of etching is expressed as $\lambda/2(n-1)$, a phase difference $\pi$ occurs between rays of light that are transmitted through optical elements having different thicknesses.

In the present exemplary embodiment, the horizontal length d2 of each of the optical elements included in the diffusing member 38 is determined on the basis of a length d of each side of each of the pixels included in the display device 30. The object beam is condensed only in the horizontal direction by the condensing lens 44. In such a case, letting the wavelength be $\lambda$ and the focal length of the condensing lens 44 be f0, the horizontal broadening of the object beam on the hologram recording medium 46 is proportional to f0$\lambda$/d. Here, if the horizontal length d2 of each optical element is set to be longer than or equal to the length d, the horizontal broadening of the object beam on the hologram recording medium 46 is f0$\lambda$/d2. That is, the size of the resulting holographic element in the horizontal direction is reduced. For example, if the length d is 19 μm, the length d1 may be set to 0.75 μm and the length d2 may be set to 19 μm.

As illustrated in FIG. 4, the object beam that enters the diffusing member 38 is diffracted by each of the rectangular or substantially rectangular optical elements whose long-side direction corresponds to the horizontal direction of the diffusing member 38. Thus, the object beam is broadened in the vertical direction. Accordingly, the field of view in the vertical direction is widened. For example, to realize a field of view of ±20° in the vertical direction by using a laser beam source that emits beam having a wavelength of 532 nm, the diffraction angle $\theta_N$ is set to 20°. FIG. 6 is a table summarizing exemplary parameters that widens the field of view in the vertical direction. For example, if the grating pitch D is set to 1.5 μm (=0.75 μm×2) and the focal length f of the lens is set to 60 mm, the diffraction angle $\theta_N$ of the first-order diffracted ray is 20.77° and the broadening z of diffracted light is 22.8 mm. Although the diffraction grating illustrated in FIG. 4 has a regular pattern, the plural optical elements may have randomly different thicknesses. In that case, low-frequency components of the object beam are more widely diffused. Consequently, resulting holographic elements are recorded efficiently.

Figure 7A:
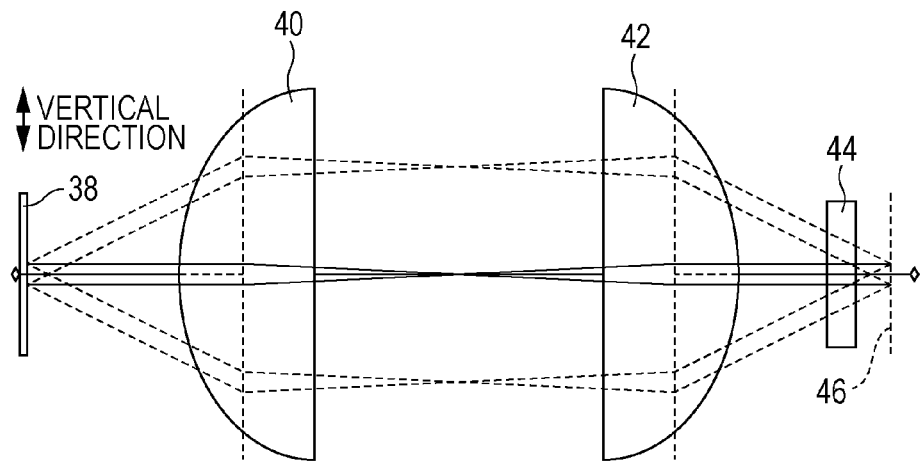
FIGS. 7A and 7B illustrate how the field of view in the vertical direction is widened.
Figure 7B:
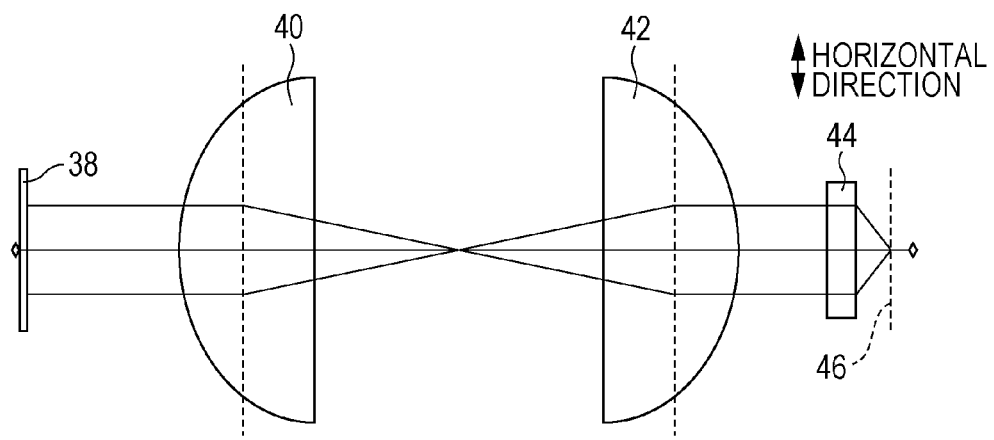

FIGS. 7A and 7B illustrate how the field of view in the vertical direction is widened. The parameters are as summarized in FIG. 6. FIGS. 7A and 7B each illustrate four optical elements: the diffusing member 38, the lens 40, the lens 42, and the condensing lens 44 illustrated in FIG. 2. FIGS. 7A and 7B illustrate how the object beam reflected by the mirror 36 is transmitted through the diffusing member 38, the lens 40, the lens 42, and the condensing lens 44 and is applied to the hologram recording medium 46.

The lens 40 and the lens 42 are relay lenses and each have a focal length of 60 mm and a diameter of 75 mm. The condensing lens 44 has a focal length of 26 mm, a vertical length of 30 mm, and a horizontal length of 30 mm. FIG. 7A is a top view. FIG. 7B is a side view.

In the case illustrated in FIGS. 7A and 7B, the display device 30 displays a rectangular image composed of 213 pixels in the vertical direction and 1024 pixels in the horizontal direction, that is, the horizontal direction corresponds to the long-side direction. Supposing that the length d of each side of each of the pixels of the display device 30 is 19 μm, the size of the image to be displayed has a vertical length of 4.047 mm and a horizontal length of 19.456 mm, which corresponds to the size of a cross-section, taken orthogonally to the optical axis, of the object beam reflected by the display device 30.

Referring to FIG. 7A, the object beam as the reflection from the display device 30 is diffused in the vertical direction by the diffusing member 38. The cross-section of the object beam that is taken orthogonally to the optical axis is increased to have a vertical length of 49.57 mm (=4.047+ 22.8×2) at the incidence on the lens 40. The lens 40 has a diameter of 75 mm. The object beam diffused by the diffusing member 38 enters the lens 40.

Referring to FIG. 7B, in the horizontal direction, the object beam reflected by the mirror 36 is not diffused by the diffusing member 38 but is condensed by the condensing lens 44 before being applied to the hologram recording medium 46. Then, a rectangular image whose long-side direction corresponds to the vertical direction is formed on the surface of the hologram recording medium 46. Here, a satisfactory field of view in the horizontal direction, which corresponds to the direction of parallax, is provided. For example, if an image having a horizontal length of 19.456 mm is recorded by using a condensing lens 44 having a focal length of 26 mm, a field of view of ±20.5° (=tan$^{-1}$((19.456/ 2)/26)) in the horizontal direction is provided.

The configurations of the diffusing member 38 and the forming apparatus described above are only exemplary and may be modified within the scope of the present invention, of course.

For example, while the above exemplary embodiment concerns a case where the diffusing member 38 is used as a component of an apparatus that forms a holographic stereogram containing parallax information only in the horizontal direction, the diffusing member 38 may be used as a diffusing member for another purpose that diffuses light on the basis of the principle of optical diffraction more widely in the top-bottom direction than in the left-right direction.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A holographic-stereogram-forming apparatus comprising:
   a laser beam source configured to generate a laser beam to be split into an object beam and a reference beam, the object beam being applied to a hologram recording medium;
   a display configured to display an original image corresponding to a substantially strip-shaped holographic element constituting a holographic stereogram containing parallax information in a horizontal direction;
   a diffusing unit provided on a light-emission side of the display and including a plurality of optical elements having different thicknesses in a direction of light transmission, the optical elements being arranged side by side in the horizontal direction and in a vertical direction in a matrix, the optical elements each having a substantially rectangular shape with a vertical length being shorter than a horizontal length, the diffusing unit being configured to diffuse the object beam more widely in the vertical direction than in the horizontal direction, the object beam to be diffused by the diffusing unit being generated by the display; and
   a condensing unit configured to condense the object beam diffused by the diffusing unit on the hologram recording medium.

2. The holographic-stereogram-forming apparatus according to claim 1, wherein, supposing that a vertical length and a horizontal length of each of pixels included in the display are each denoted by d, the optical elements of the diffusing unit each have a horizontal length d2 that is longer than or equal to the length d.

3. The holographic-stereogram-forming apparatus according to claim 1, wherein the plurality of optical elements of the diffusing unit are configured to cause randomly different phase shifts.

4. The holographic-stereogram-forming apparatus according to claim 1, wherein the diffusing unit is provided between the display and the condensing unit.

5. The holographic-stereogram-forming apparatus according to claim 1, wherein the holographic-stereogram-forming apparatus is configured without any diffusing plate being provided immediately in front of the hologram recording medium.

6. The holographic-stereogram-forming apparatus according to claim 1, wherein the holographic-stereogram-forming apparatus is configured without any diffusing plate being provided between the condensing unit and the hologram recording medium.

7. The holographic-stereogram-forming apparatus according to claim 1, wherein each one of the plurality of optical elements has one respective prescribed thickness throughout an entirety of the respective optical element.

8. The holographic-stereogram-forming apparatus according to claim 1, wherein each one of the plurality of optical elements is configured with one respective prescribed phase shift region throughout an entirety of the respective optical element.

9. A holographic-stereogram-forming method comprising:
   generating a laser beam to be split into an object beam and a reference beam, the object beam being applied to a hologram recording medium;
   displaying an original image on a display, the original image corresponding to a substantially strip-shaped holographic element constituting a holographic stereogram containing parallax information in a horizontal direction;
   diffusing the object beam more widely in the vertical direction than in the horizontal direction, the object beam to be diffused being generated on a display and being transmitted through a plurality of optical elements having different thicknesses in a direction of light transmission, the optical elements being arranged side by side in the horizontal direction and in a vertical direction in a matrix, the optical elements each having a substantially rectangular shape with a vertical length being shorter than a horizontal length; and
   condensing the diffused object beam on a hologram recording medium.

* * * * *